United States Patent
Reddy et al.

(10) Patent No.: US 6,215,459 B1
(45) Date of Patent: *Apr. 10, 2001

(54) DUAL DISPLAY VIDEO CONTROLLER (75) Inventors: Dayakar C. Reddy, San Jose; Chester Floyd Bassetti, Jr., Pleasanton, both of CA (US)

(73) Assignee: Cirrus Logic, Inc., Austin, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/130,577

(22) Filed: Oct. 1, 1993

(51) Int. Cl.[7] .................................................. G09G 5/00
(52) U.S. Cl. ................... 345/3; 345/1; 345/511
(58) Field of Search .................. 345/1, 185, 3, 345/213, 203, 508, 511

(56) References Cited

U.S. PATENT DOCUMENTS

| | | | |
|---|---|---|---|
| 4,760,388 | * | 7/1988 | Tatsumi .................................... 345/1 |
| 4,980,678 | | 12/1990 | Zenda .................................... 340/716 |
| 5,122,783 | | 6/1992 | Bassetti, Jr. . |
| 5,150,109 | * | 9/1992 | Berry ....................................... 345/3 |
| 5,185,602 | | 2/1993 | Bassetti, Jr. et al. . |
| 5,254,984 | * | 10/1993 | Wakeland .............................. 345/144 |
| 5,300,943 | * | 4/1994 | Jakobs ....................................... 345/1 |
| 5,387,923 | * | 2/1995 | Mattison .............................. 345/103 |

OTHER PUBLICATIONS

"Crystal–Clear Presentations" by Suzanne Stefanac, Macworld, Jan. 1993, pp. 157–163 Cirrus Logic Advance Data Book CL–GD6440, Jan. 1993, pp. 1–38.

* cited by examiner

Primary Examiner—Kent Chang
(74) Attorney, Agent, or Firm—J. P. Violette; Peter Rutkowski; David L. Stewart (57) ABSTRACT

A video controller for controlling at least two video displays incorporates a video memory for storing first and second video frames of interleaved pixel data. A video memory controller connected to the video memory sequentially reads data for a first pixel from the first video frame and data for a second pixel from the second video frame. Each pixel data is in turn transferred to a look-up table connected to the video memory controller which converts the first and second pixel data to first and second display data. A selector coupled to the look-up table alternately routes the first display data to one video display and routes the second display data to the other video display.

7 Claims, 9 Drawing Sheets

FIG. 1

(PRIOR ART)

| 1 | 2 | 3 | 4 | ○ | ○ | ○ | 639 | 640 |
|---|---|---|---|---|---|---|---|---|
| 641 | 642 | 643 | ○ | ○ | ○ | ○ | ○ | 1280 |
| 1281 | 1282 | ○ | ○ | ○ | ○ | ○ | ○ | ○ |
| ○ | ○ | ○ | ○ | ○ | ○ | ○ | ○ | ○ |
| ○ | ○ | ○ | ○ | ○ | ○ | ○ | ○ | ○ |
| ○ | ○ | ○ | ○ | ○ | ○ | ○ | ○ | ○ |
| ○ | ○ | ○ | ○ | ○ | ○ | ○ | ○ | ○ |
| 305, 921 | 305, 922 | ○ | ○ | ○ | ○ | ○ | ○ | 306, 560 |
| 306, 561 | 306, 562 | ○ | ○ | ○ | ○ | 307, 198 | 307, 199 | 307, 200 |

DUAL DISPLAY VIDEO CONTROLLER

TECHNICAL FIELD

The present invention is directed to video controllers and video controller integrated circuits for computer displays. The present invention has particular application to so-called multimedia methodology.

BACKGROUND ART

It is common to provide so-called transportable, lap-top, notebook or palm-top computers with built-in displays. Within the computer industry the term "transportable" is generally defined as a computer relatively easily transported for use at another site, but without internal battery power. These transportable computers are sometimes referred to as "luggables". The term "lap-top" refers to a computer usually somewhat smaller than a transportable computer, with an internal battery power supply for portable use. The term "notebook" refers to a later generation of computers than so-called lap-tops, generally smaller than lap-tops (i.e., the size of a notebook, or approximately 9" by 12") and also internally powered by batteries. The term "palm-top" refers to a new generation of portable computer, even smaller than the notebook, and also powered by internal batteries. So-called "palm-top" computers are sometimes referred to by the acronym PA for "personal assistant". For the purposes of this disclosure, all four of these types of computers will be collectively referred to herein as "portable" computers.

Due to the generally limited size or resolution of built-in displays in portable computers, it has been known in the art to provide an external output for a stand-alone display, such as a CRT display monitor or the like. For example, early Osborne (TM), Compaq (TM) and IBM (TM) transportable computers included internal CRT displays of limited size (e.g., 9" diagonal monochrome CRT display or the like). In many instances, these early portable computers were provided with an external output port (MDA, CGA, MCGA or the like) so that a larger external monitor could be attached to the portable computer when higher resolution was desired.

Later generation lap-top computers (e.g., Toshiba (TM) 3100SX or the like) were equipped with similar output ports such that an output intended for an internal monochrome display (e.g., gas plasma flat panel display, LCD flat panel display or the like) could be more effectively displayed on an external color monitor (e.g., VGA, SGVA or the like). More recent notebook size computers (e.g., Apple (TM) Powerbook (TM), Toshiba (TM) 2200 or the like) have provided similar external display outputs.

In most of these computers, the external output ports made available are designed such that only one display at a time can be activated. In other words, either the internal display or the external display can be viewed, but not both simultaneously. Improved VGA controllers designed by Cirrus Logic (TM), the assignee of the present application, incorporate SimulScan (TM), a feature which allows a user to simultaneously view the same image on both an internal display and an external display.

Figure 1:
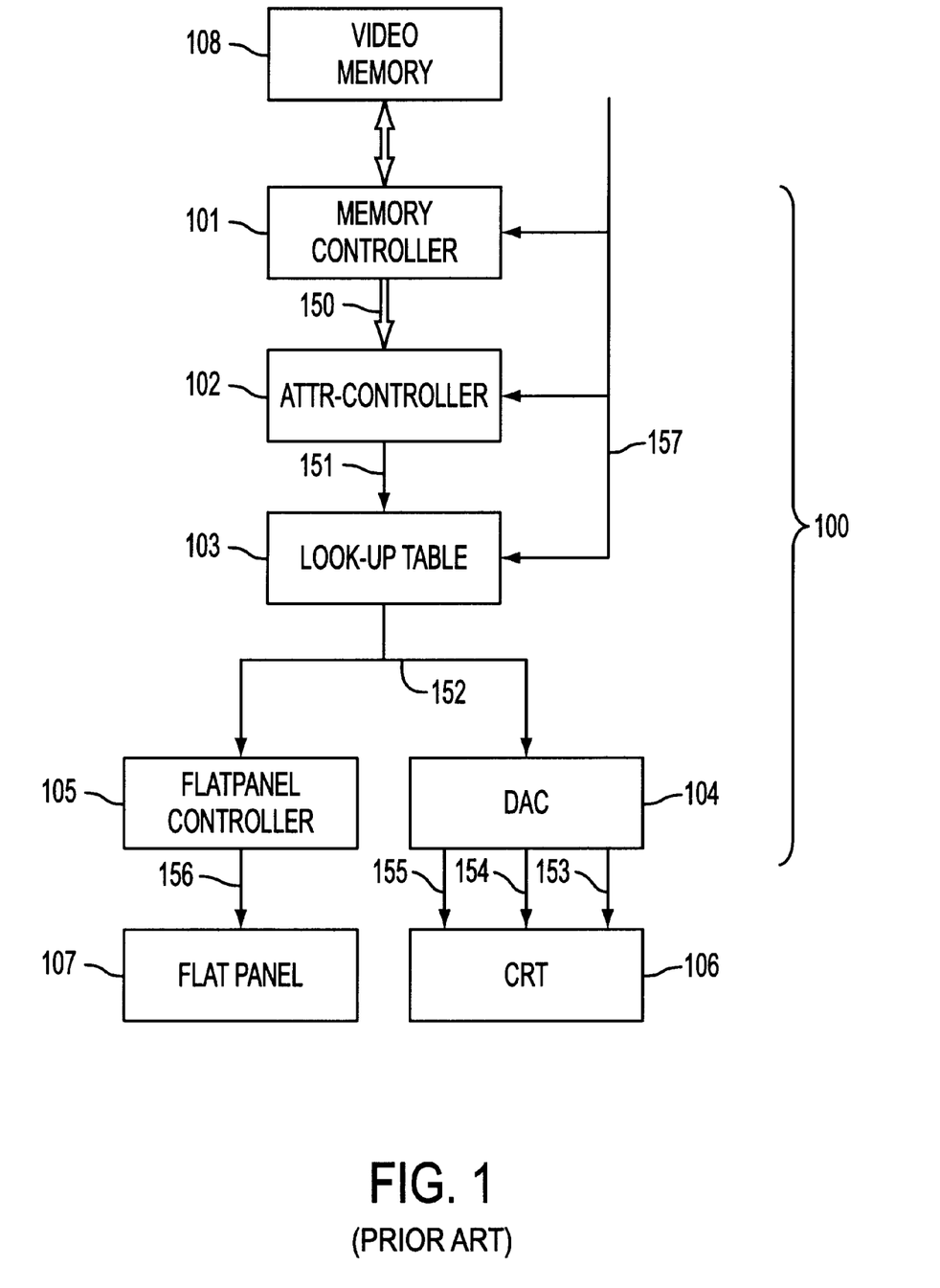
FIG. 1 is a schematic diagram of a prior art video controller.

FIG. 1 is a block diagram of a prior art video controller 100 which can display the same video image to both CRT display 106 (or external display) and an internal flat panel display 107 (e.g., LCD flat panel display or the like). Video memory 108 comprises a random access memory (e.g., DRAM, SRAM or the like) which may be accessed through memory controller 101. The size of video memory 108 is determined by the amount of video data to be displayed at one time. For example, for a 640 by 480 pixel monochrome display, a minimum of 307,200 bits of data is needed. If a multi-color or gray scaled monochrome display is desired, then the necessary number of bits per pixel may be increased. For example, if eight bits are provided for each pixel, then each pixel may take one of $2^8$ or 256 colors (or gray scales). For eight bits of data per pixel, a 640 by 480 pixel display requires a minimum of 2,457,600 bits of information, or 76.8 Kilobytes of DRAM, where each word comprises 32 bits (four 8-bit bytes), representing four pixels. In practice, a standard size memory of 1 Megabytes may be used and more than one frame of video stored at one time.

As shown in FIG. 1, memory controller 101 accesses video memory 108 and passes to attribute controller 102 one word 150 (32 bits) from video memory 108, preferably using a page mode addressing scheme. Attribute controller 102 contains a register (not shown) for holding four pixel bytes 151 of eight bits each, from 32 bit word 150 supplied by from video memory 108. Attribute controller 102 outputs each of the eight bit pixel bytes 151 in sequence to look-up table 103. Look-up table 103 comprises another random access memory having, in this example, at least 256 addresses. Look-up table 103 converts each of the eight bit pixel bytes 151 into an eighteen bit binary number (hereinafter referred to as pixel word 152) representing a pixel color (or gray scale). Look-up table 103 takes one of the four eight bit pixel bytes 151 as an address for its internal random access memory and outputs an eighteen bit binary number stored as that address as pixel word 152 representing the color (or gray scale) for that pixel. Individual computer application programs may be able to alter the contents of look-up table 103 such that any or all of the 256 available colors may be selected from a palette of $2^{18}$ or 262,144 colors. Of course, other numbers of bits may be used to provide a broader range or palette of available colors. Further, although only 256 of these colors are shown here as being available at one time, other numbers of colors per pixel may be used by increasing the number of bits per pixel byte 151.

From look-up table 103, the eighteen bit pixel word 152 is transferred to DAC 104. DAC 104 comprises a digital-to-analog converter which converts the eighteen bit pixel word 152 into analog RGB (Red, Green, Blue) signals 153, 154, and 155 to drive analog CRT display 106. In the embodiment shown in FIG. 1, six bits each from eighteen bit pixel word 152 are used to create analog signals 153, 154, and 155 for Red, Green and Blue levels. DAC 104 typically comprises a number of current sources which may be added together in a binary fashion to create an appropriate analog signal level for each of the outputs 153, 154, 155 corresponding to a selected six bits of the eighteen bit pixel word 152.

Flat panel display 107 (which may comprise an active or passive LCD flat panel display, plasma display, electroluminescent display or the like), however, does not rely upon an analog signal to determine pixel intensity or color. Thus, in order to provide a simultaneous display on both CRT display 106 and flat panel display 107, two different drive signals must be generated. As shown in FIG. 1, eight bit pixel bytes 151 are converted via look-up table 103 into eighteen bit pixel words 152. Flat panel controller 105 uses eighteen bit pixel words 152 to generate an appropriate video display on flat panel display 107. For a monochrome display, the eighteen bit pixel word 152 may be converted into a grayscale value using an appropriate internal conversion algorithm. Flat panel controller 105, using dithering techniques, generates this grayscale on flat panel display 107. For a color display, eighteen bit pixel word 152 may be converted into separate red, green and blue sub-pixels. Flat panel controller 105, using dithering techniques, generates appropriate color intensities for each subpixel. Such dithering techniques are described in Bassetti, Jr., U.S. Pat. No. 5,122,783, issued Jun. 16, 1992, assigned to the same assignee as the present application and incorporated herein by reference. Thus, with the apparatus of FIG. 1, it is possible to display the same image on both flat panel display 107 and CRT display 106.

Recently, however, so-called "multimedia" presentations have become increasingly popular. These presentations usually, as the name implies, use a variety of media (e.g., sound, image, video or the like) to make an information presentation such as a sales promotion, or educational lecture. For the travelling lecturer, a powerful lap-top or notebook computer, coupled to a portable LCD projector screen and overhead projector can provide a dynamic and effective presentation. An LCD projector screen can be coupled to an external video port (e.g., VGA, EGA or the like) of most portable computers and, when coupled to an overhead projector, project a display image onto a wall or screen. Other types of LCD projector screens incorporate the projector (e.g., light source, focusing lenses) into one compact unit. Alternatively, a large, high resolution monitor can be used to provide a presentation display for a small to medium sized group. The computer allows the use of action video and colorful special effects, and in addition avoids the problems associated with using a stack of overhead transparencies.

However, when such multimedia display equipment is used with conventional portable computers, at best, only the same image can be displayed on both displays (internal or projected) at the same time. In many instances, it is desirable to project the presentation display on an external monitor while displaying other information (e.g., speaker's notes or the like) on an internal display. It is also desirable to be able to switch images between the two displays, such that a speaker can preview an image before projecting the image to the viewing audience. In addition, the need for two video displays containing different images may arise in other situations where computers are used, such as CAD systems, spreadsheets, word processors or the like.

The prior art approach to providing multiple displays with different images for one computer has been to provide separate controllers for each display. Early versions of Lotus 1-2-3 (TM), for example, took advantage of this technique by allowing a user to view two different displays (MDA and CGA) simultaneously. Such a technique was possible, as each controller used a different logical address in the memory of the host computer.

The Apple (TM) Powerbook (TM) computer is believed to use a similar dual controller technique to provide for two different displays having the same resolution and refresh rate. In the lap-top or notebook environment, however, the use of two separate controllers can increase power drain and increase cost, weight and size of the computer, all especially critical in the highly competitive notebook computer market.

Thus, one object of the present invention is to provide a single video controller which can control more than one video display.

A further object of the invention is to provide a video controller which can produce different images on different displays.

A further object is to provide a video controller which can produce different images on different displays and switch the images between the displays.

Yet a further object is to provide a video controller which can produce different images on different displays while providing an easy to use software model for writing video information for the different images into a video memory.

DISCLOSURE OF THE INVENTION

A video controller for controlling at least two video displays comprises a clock for providing a timing signal and a video memory for storing first and second video frames of interleaved pixel data. A video memory controller coupled to the video memory and clock reads first pixel data from the first video frame on a first clock cycle and second pixel data from the second video frame on a second clock cycle. Each pixel data is in turn transferred to a look-up table coupled to the video memory controller which converts the first and second pixel data to first and second display data. A selector coupled to the look-up table and the clock receives the first and second display data and selectively routes the first display data to one video display and routes the second display data to the other video display.

Still other objects and advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BEST MODE FOR CARRYING OUT THE INVENTION

Figure 2:
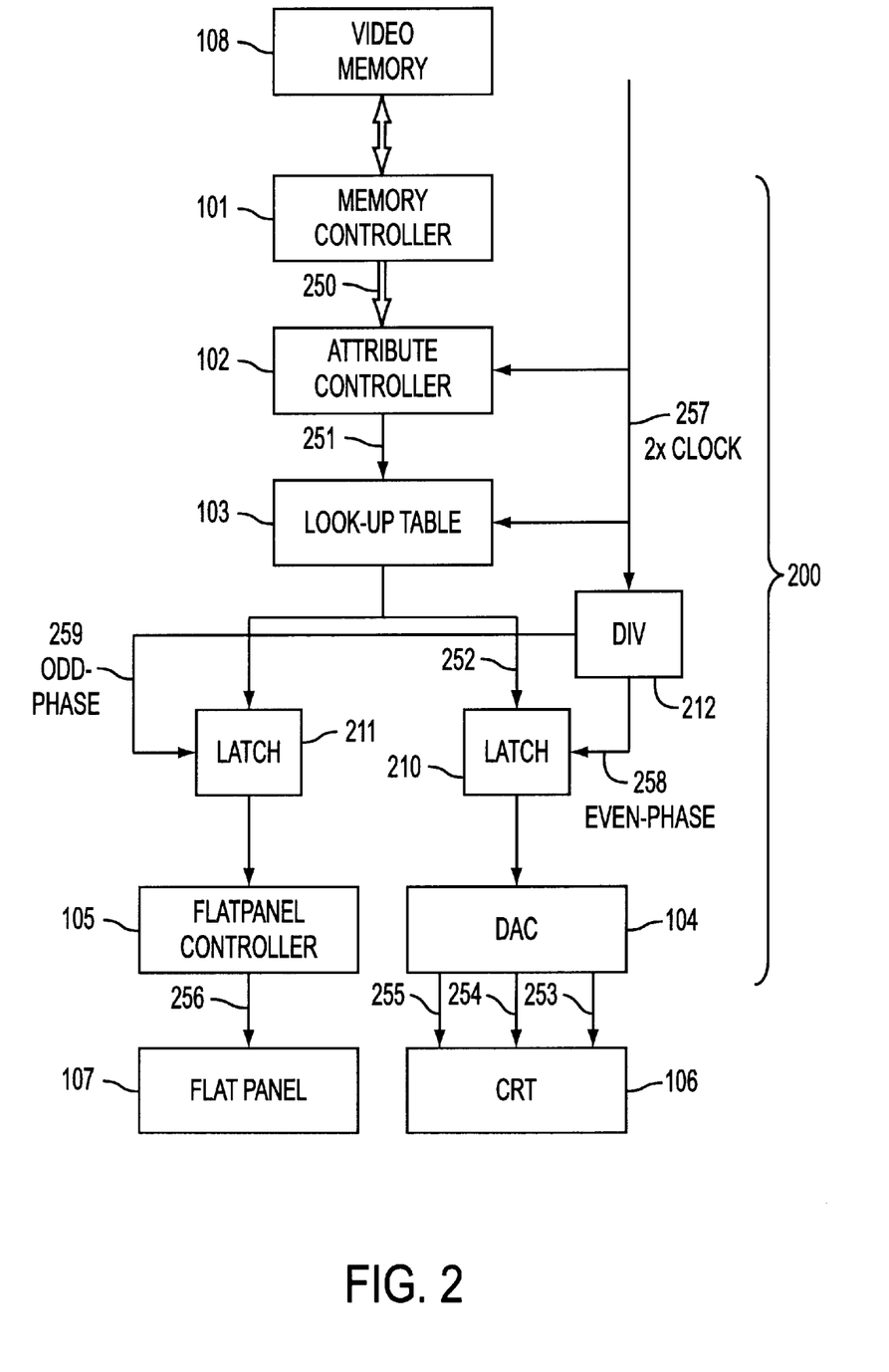
FIG. 2 is a schematic diagram of one embodiment of a video controller of the present invention.
Figure 3:
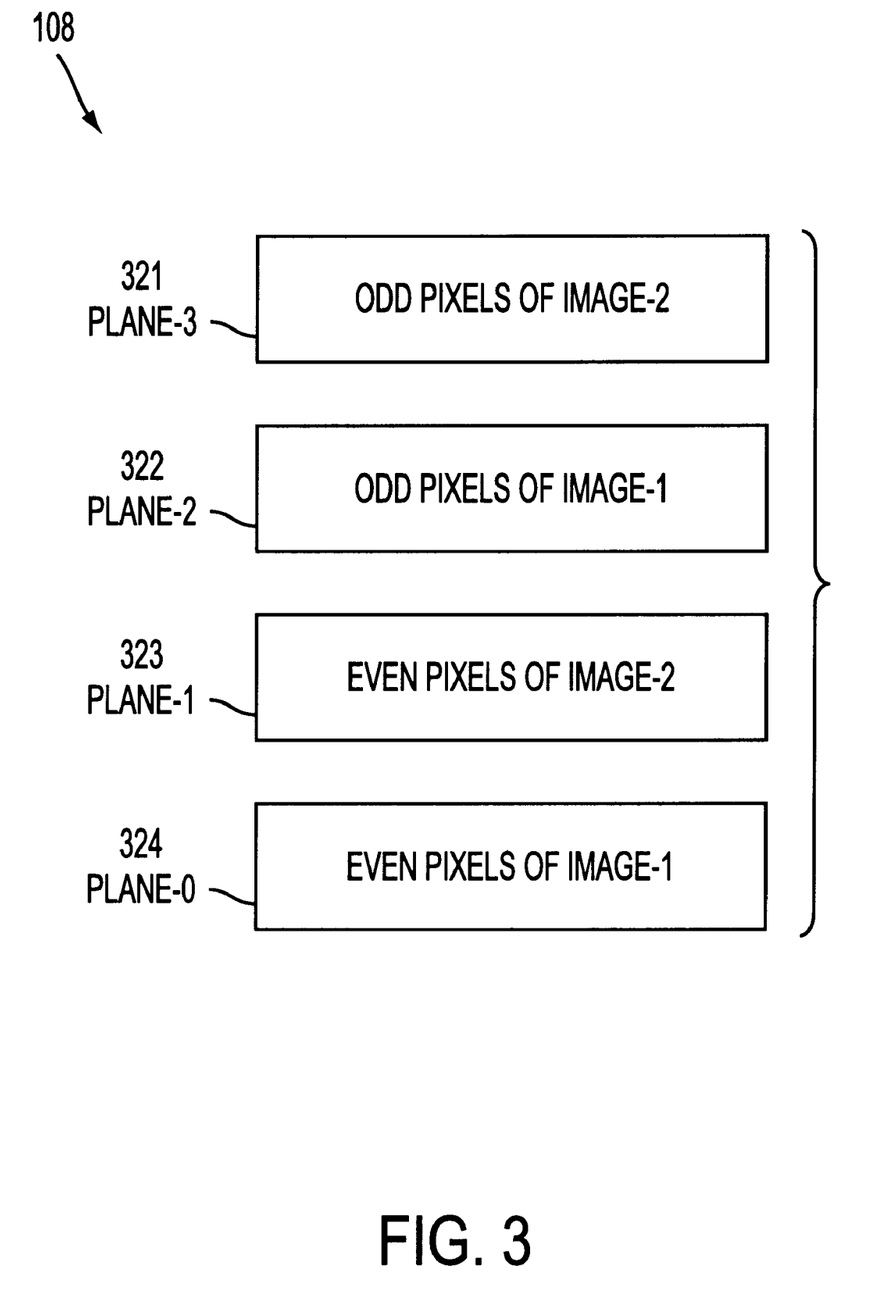
FIG. 3 is a diagram of a memory map corresponding to the schematic of FIG. 2.

Referring to FIGS. 2 and 3, the first embodiment of the present invention will be described in detail. FIGS. 2 and 3 show a block diagram and memory map, respectively, for a video controller 200 for displaying two different images on two separate displays 106 and 107 at the same time. The system of FIG. 2 allows for the use of displays having the same resolution (i.e., the same number of pixels) and same refresh rate. In this example, both displays have the same 640 by 480 pixel resolution, as discussed above in connection with FIG. 1, and both displays have the same 60 Hz refresh rate. Of course other resolutions and refresh rates may be used without departing from the spirit and scope of the invention so long as the resolutions and refresh rates are the same for both displays. A system for use with displays having different resolutions or refresh rates will be described later in conjunction with FIGS. 7–9. For the sake of illustration, the block diagram of FIG. 2 depicts the system used with a flat panel display and CRT display. Other types and number of displays may be used, and the displays need not be of different types.

FIG. 2 shows video controller 200 connected to a video memory 108 and includes memory controller 101, attribute controller 102, and look-up table 103 in an arrangement similar to that of FIG. 1. However, in FIG. 2, clock 157 of FIG. 1 has been replaced by 2× clock 257 having a frequency twice that of clock 157. Attribute controller 102 may generate pixel data 251 in a format of 1, 2, 4 or 8 bits per pixel (2, 4, 16 or 256 colors, respectively) from video data stored in video memory 108, however, in the present example, eight bits per pixel are used to represent a total of 256 colors. Pixel data 251 is normally passed through look-up table 103 and eventually drives CRT display 106 and flat panel display 107. Although the 8 bits/pixel mode is shown as an example, the concepts described herein can be applied to varying depth of colors.

FIG. 3 shows a memory map for use with the block diagram of FIG. 2. Video memory 108 may be divided into a series of four planes 321–324. In the example shown, video memory 108 contains at least 153,600 bytes of memory, with each word (four bytes) containing 32 bits. Each plane 321–324 contains a series of eight bit pixel bytes. Thus, one word of video memory 108 comprises four eight bit pixel bytes, one from each plane 321–324.

As shown in FIG. 3, plane 321 comprises odd pixels for a second image, and plane 323 comprises even pixels for a second image. In this example, the second image may comprise the image intended to be initially displayed on flat panel display 107. Plane 322 comprises odd pixels for a first image, and plane 324 comprises even pixels for a first image. In this example, the first image may comprise the image intended to be initially displayed on CRT display 106.

Figure 6:
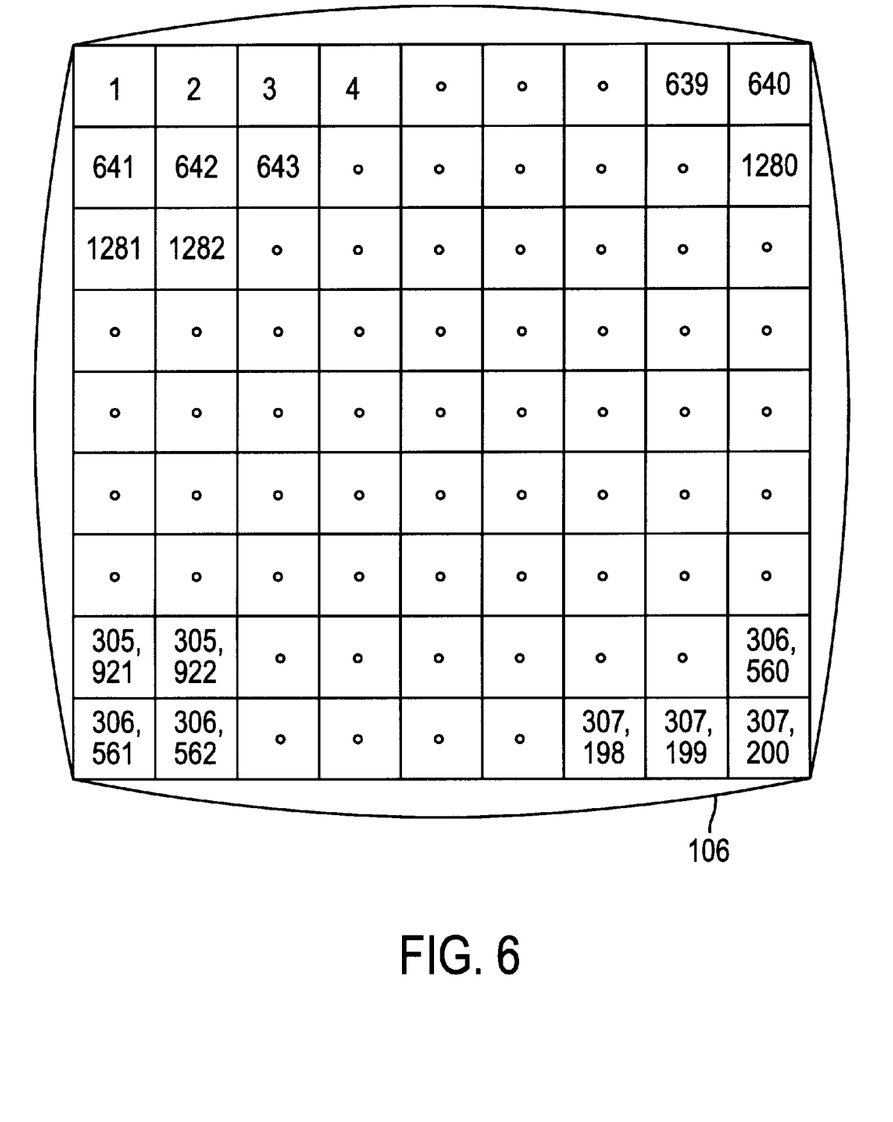
FIG. 6 is a diagram of a CRT display showing the numbering scheme for even and odd pixels.

In FIG. 3, the terms "even" and "odd" refer to the number of the pixel to be displayed as illustrated in FIG. 6. FIG. 6 shows a portion of CRT display 106 with a series of pixels numbered 1 through 307,200. For the sake of clarity, only a portion of the total number of pixels is shown. In a 640 by 480 pixel display, there are a total of 640×480 or 307,200 pixels. In CRT display 106 as shown in FIG. 6, the pixels are generated starting in the upper left hand corner of CRT display 106. The first pixel is numbered one, the second two, and so on until the end of the first row, which ends with pixel number 640. The second row begins with pixel number 641 and ends with pixel number 1280. These numbers continue in sequence to the last row (the 480th row) which begins with pixel number 306,561 and ends with pixel number 307,200.

In FIG. 6, each column of pixel numbers is either even or odd. The first column contains all odd numbered pixels (1, 641, 1281 . . . 305,921, 306,561), whereas the second column contains all even numbered pixels (2, 642, 1282 . . . 305,922, 306,562). Those columns containing even numbered pixels are the so-called "even" pixels, and those odd numbered pixels are the so-called "odd" pixels. Although not shown, flat panel display 107 has a similar arrangement of even and odd pixels arranged in the same columns and rows. As shown in FIG. 3, these pixels are stored in alternate planes of video memory 108 to interleave the images. Thus, pixel 1 of FIG. 6 would be stored in plane 322, pixel 2 stored in plane 324, pixel 3 stored in plane 322, and so on. As will be discussed below, the interleaving of even and odd pixels of the first and second images into video memory 108 allows for an economy of components in the controller design.

Figure 5:
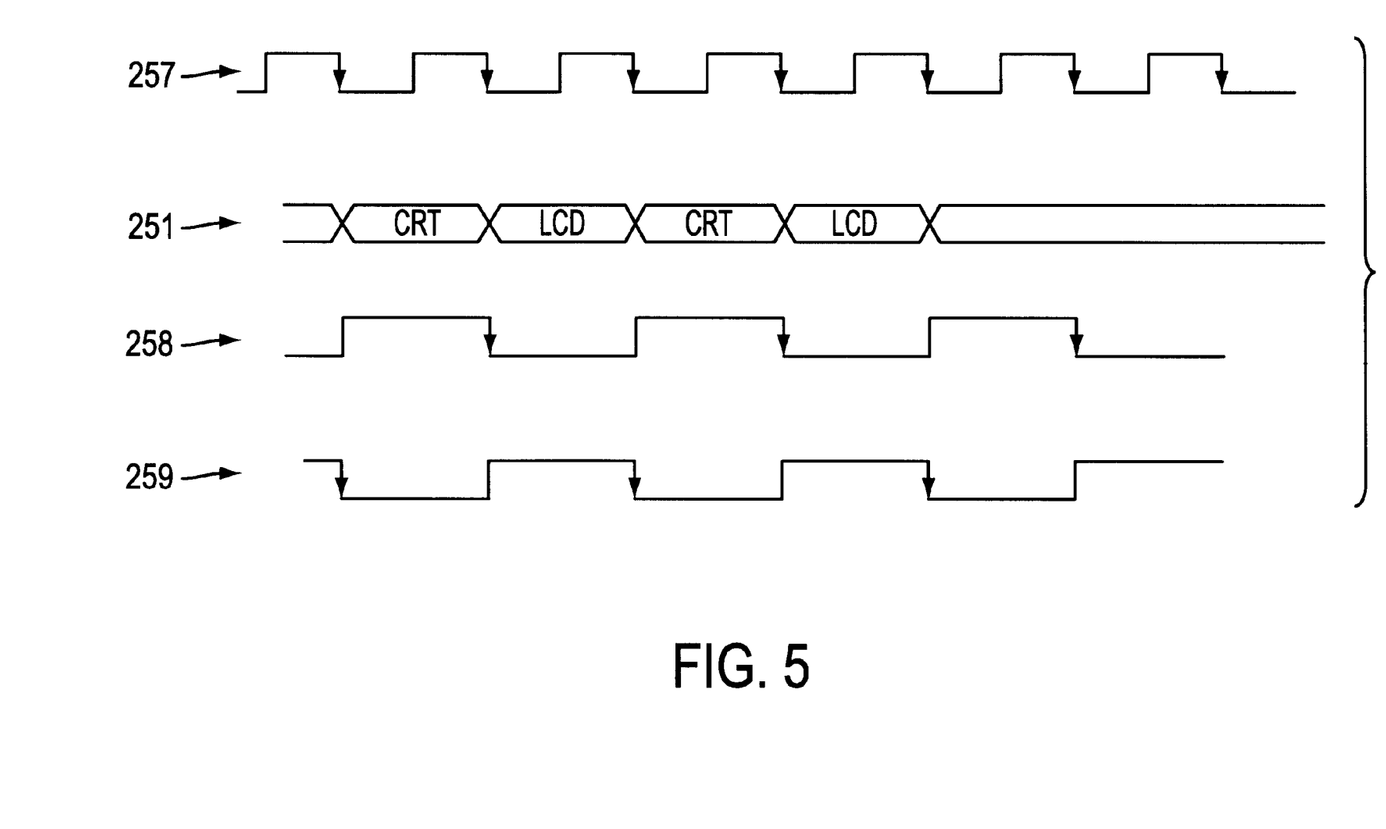
FIG. 5 is a timing diagram for the video controller of FIG. 2.

Referring back to FIG. 2, Attribute controller 102 and the look-up table 103 are run at twice the clock frequency 157 shown in FIG. 1. Clock 257 is fed into flip-flop 210 to produce even and odd phase clock signals 258 and 259 as shown in FIG. 5. Even phase clock signal 258 generates data for the CRT display while odd phase clock signal 259 generates data for the flat panel display 107.

At the rising edge of a clock signal 257, Attribute controller 102 reads out one 32 bit word 250 in the page mode from video memory 108. Each 32 bit word 250 comprises four pixel bytes 251, each eight bits in length. The format of 32 bit word 250 conforms to the planes 321–324 shown in FIG. 3. In other words, the first eight bits of 32 bit word 250 comprise an odd pixel byte for a second image, the second eight bits of 32 bit word 250 comprise an odd pixel byte for a first image, the third eight bits of 32 bit word 250 comprise an even pixel byte for a second image, and the last eight bits of 32 bit word 250 comprise an even pixel byte for a first image. Although four planes are shown to interleave two images, other numbers of images and planes could be used. For example, two images could be interleaved on two planes in a 16 bit wide memory, or in a system using 16 pixel bits on a 32 bit wide memory.

Once attribute controller 102 has stored a 32 bit word 250 in its internal register, it clocks out one eight bit pixel byte 251 on each subsequent cycle of clock 257, reading the next 32 bit word 250 when all four eight bit pixel bytes 251 have been read out. In this manner, attribute controller 102 reads out a series of pixels in the order shown in FIG. 5. As in FIG. 1, each of these eight bit pixel bytes is sequentially fed to look-up table 103 which converts eight bit pixel byte 251 into an eighteen bit pixel word 252 corresponding to the pallet color selected for that pixel byte.

The output of look-up table 103 is then fed to both latches 210 and 211. Latches 210 and 211 are clocked by the even and odd phases 258 and 259 of the operating clock 257 generated by flip-flop 212. Flip-flop 212 may comprise, for example a so-called D-type flip-flop, with even phase clock 258 generated by the Q output of flip-flop 212 and odd phase clock 259 generated by the inverted Q output. Alternatively, even phase clock 258 may be generated by a frequency divider (or from a clock which is used to drive a frequency doubler which in turn drives 2× clock 257) and odd phase clock 259 generated from a simple inverter inverting even phase clock 258.

The effect of latches 210 and 211 is to alternately feed pixel word 252 from look-up table 103, to either DAC 104 and flat panel controller 105. Since video memory 108 has been read at twice the normal clock frequency 157, the output of either latch 210 or latch 211 will be a data stream at the same rate as the data stream output of look-up table 103 shown in FIG. 1. DAC 104 and flat panel controller 105 operate in the same manner as the controller shown in FIG. 1 to drive CRT display 106 and flat panel display 107, respectively.

By swapping the even and odd phase clock signals 258 and 259 to latches 210 and 211, it is also possible to swap the first and second images back and forth from one display to the other. Even and odd clock signals 258 and 259 can be switched using simple combinational logic circuitry (not shown) driven by a register bit (not shown). A similar scheme may be used to allow a user to display the same image on both screens simultaneously. Since both image pixels are fed to both latches 210, 211, changing the phase of the clock signal to a latch 210 or 211 changes which image is displayed on either CRT display 106 or flat panel display 107. In a similar manner, other numbers of images can be chosen for alternate display on other numbers of displays. For example, four images can be generated to be selectively displayed on one of two displays by running clock 257 at four times normal speed and interleaving four sets of even and odd images.

By interleaving the data for the first and second images, the system of FIG. 2 also keeps the software model very simple. In a typical VGA controller, for example, video memory 108 is built of 4 planes. Each plane is one byte wide. In this scheme, two planes are used for each of the first and second images. To keep the hardware simple and yet not complicate the software model, the 2 images are interleaved within the planes.

Figure 4:
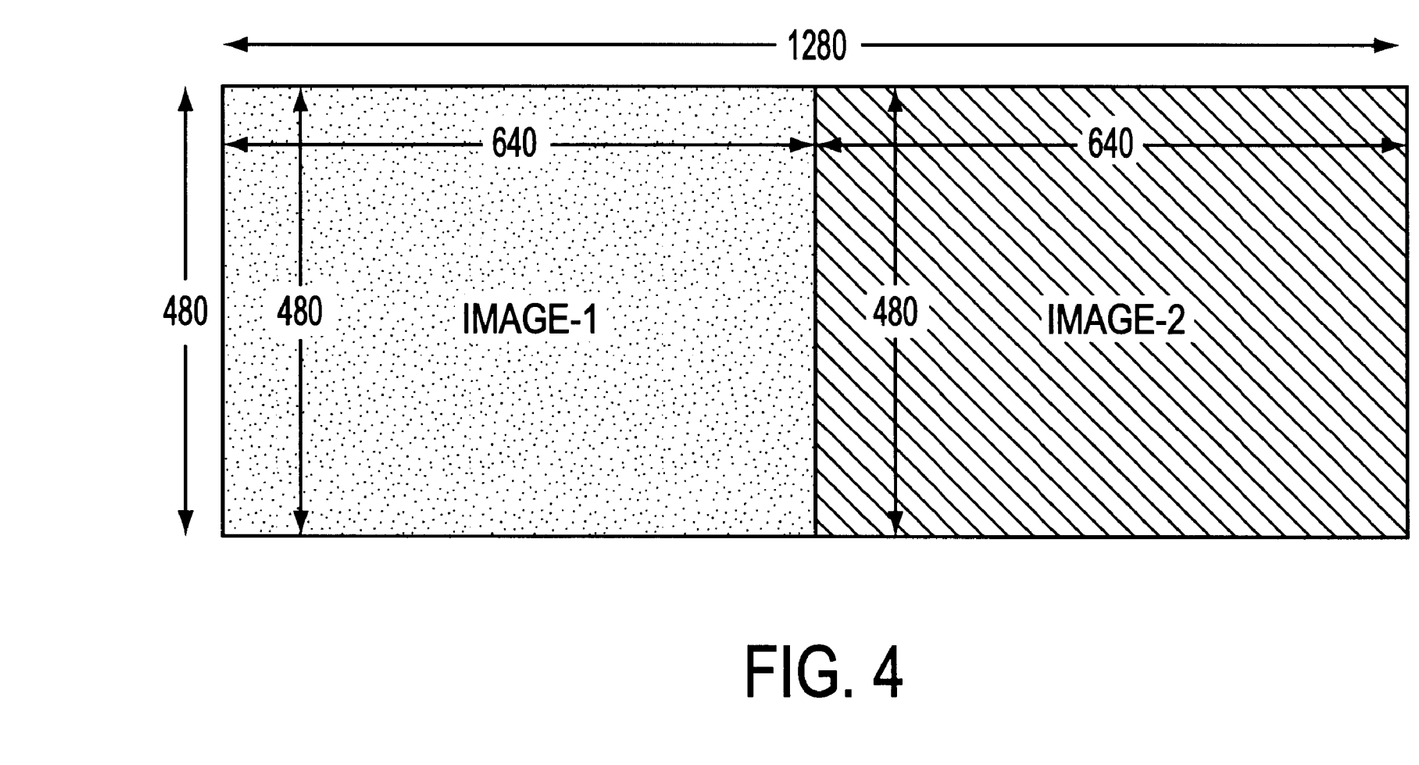
FIG. 4 is an image map showing the software model of the memory map of FIG. 3.

This scheme of interleaving images across planes can be inefficient for updating with new images. Thus, it may be necessary to provide enough hardware assist so that the software model does not become too complex. As in the example, assume a resolution of 640×480×256 colors or 307,200 bytes. The two images at this resolution are seen as one image of 1280×480×256 colors by the software as shown in FIG. 4. These two images are mapped into the physical memory as interleaved images shown in FIG. 3 occupying 153,600 locations of 32 bit wide video memory.

Normally only one image is updated at a time. Since both the images have a common physical address, it is necessary to be careful not to disturb the other image while updating the current one. To facilitate this, a register bit (not shown) is provided which defines whether the first image or the second image is enabled depending on the state of this bit. As an example, assuming that the first image is to be updated, looking at FIG. 4, the first scan line of image is between column 1 and 640. The next scan line of the image starting 640 pixels (after image 2) after the end current scan line. Hence, an offset of 640 is added to the end of the current scan line in order to point to the next scan line. However within each scan line, the pixels are continuous. This is very significant when looking at the FIG. 3. These continuous pixels need to be spread across to planes 0 & 2 based on the even or odd pixels.

Figure 7:
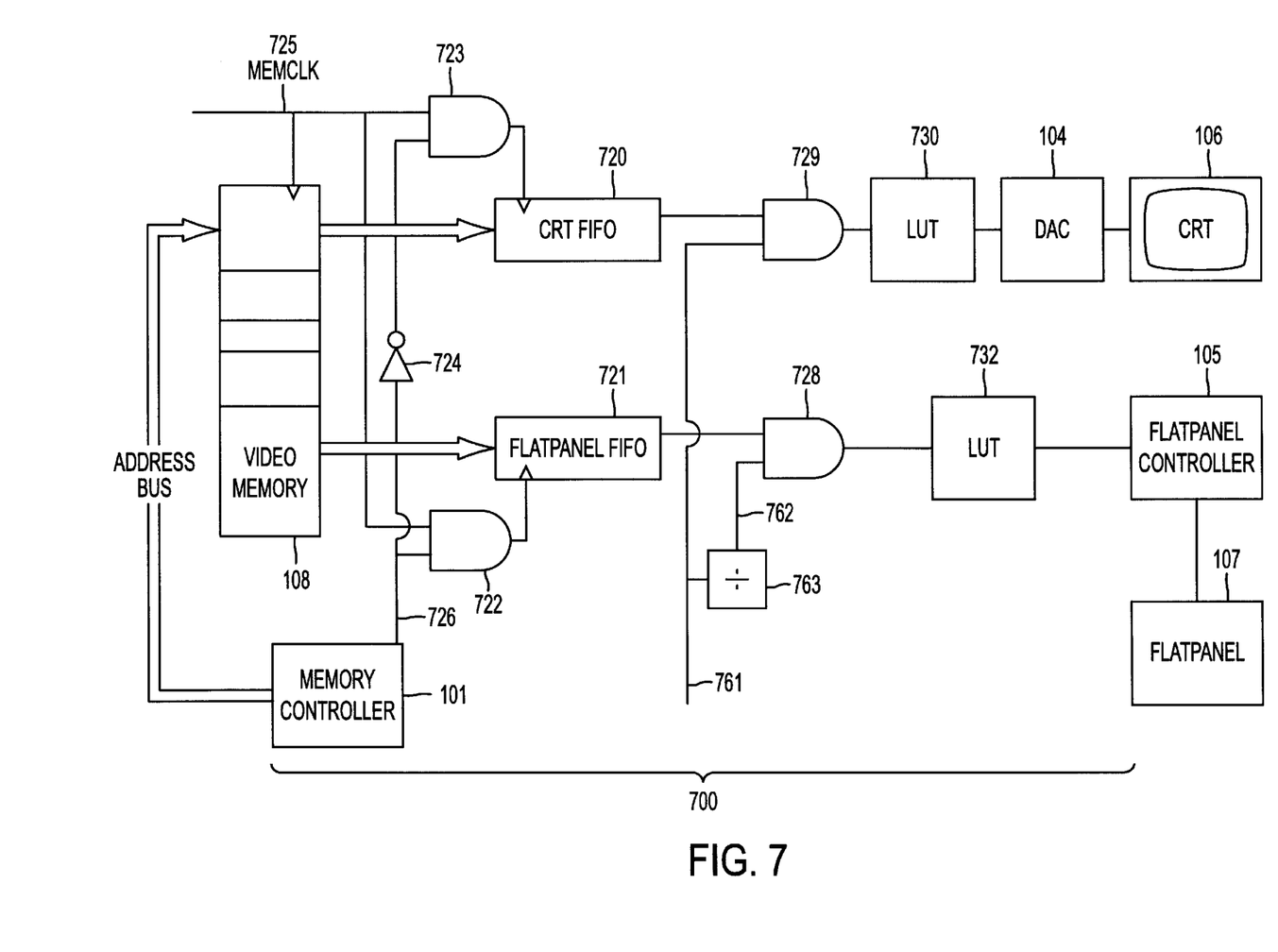
FIG. 7 is a schematic diagram of an alternative embodiment of the present invention.
Figure 8:
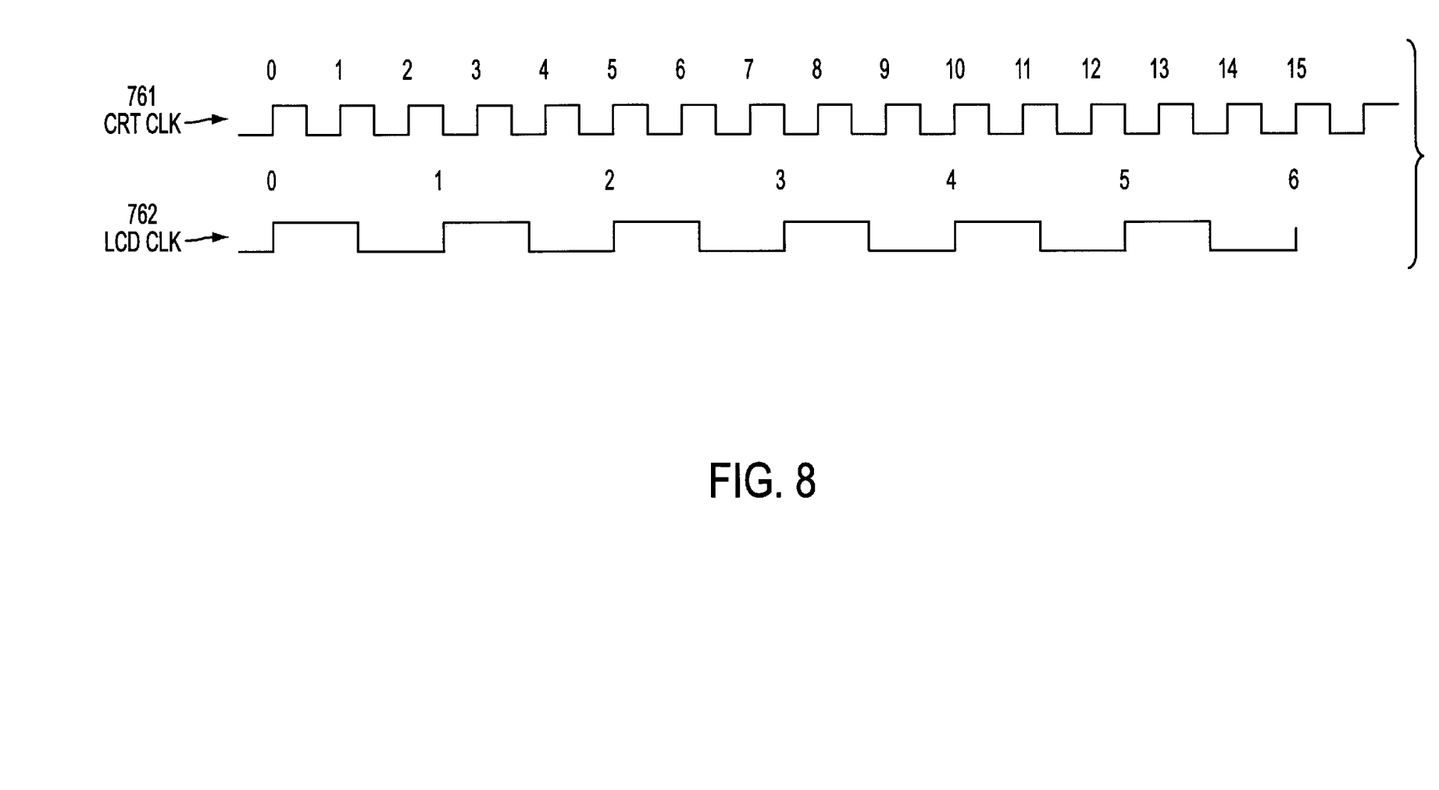
FIG. 8 is a timing diagram for the alternative embodiment of FIG. 7 where two displays having the same refresh rate have different resolutions.
Figure 9:
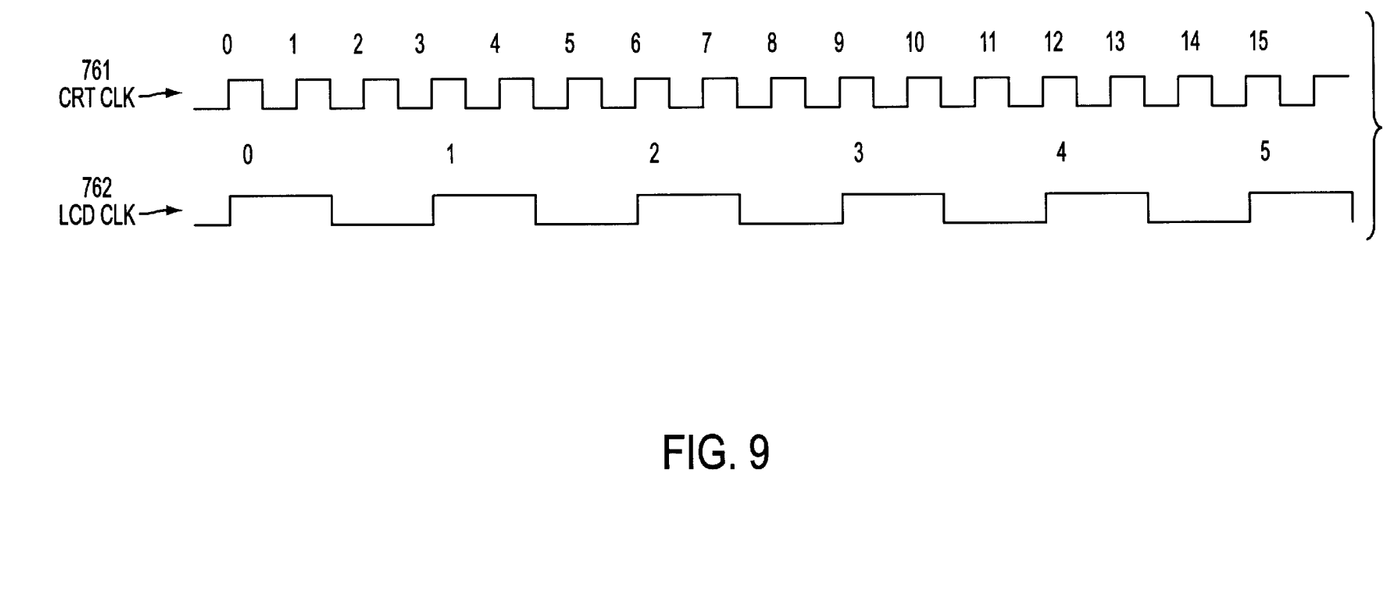
FIG. 9 is a timing diagram for the alternative embodiment of FIG. 7 where two displays have different refresh rates and different resolutions.

Referring now to FIGS. 7–9, an alternative embodiment of the present invention will now be discussed. In the embodiment described above in connection with FIGS. 2–3, it was assumed that both displays would have the same resolution (e.g., the same number of horizontal and vertical pixels) and the same refresh rates. Unfortunately, this may be an isolated case. Thus an alternative embodiment of the present invention allows for the use of two displays having different resolutions, different refresh rates, or both.

For example, VGA displays are known with various pixel resolutions and refresh rates. Some resolutions to be considered include 640×480, 800×600, 1024×768, 1120×780, 1280×800, 1280×1024 and 1152×900. Various refresh rates could include 60 HZ, 72 HZ, 80 HZ, 90 Hz and 120 HZ. As discussed above, although disclosed in an environment having two displays, the present invention can be applied to more than two displays. Further, the present invention can be applied to any combination of CRT display or LCD displays, or any other types of displays. Resolutions less or greater than the examples given above can also be used and are within the scope of this patent.

FIG. 7 shows a video controller 700 for use with two video displays having different resolutions, refresh rates, or both. Pixel data may be interleaved in video memory 108 as discussed above, or may be stored as separate first and second images in separate, contiguous portions of video memory 108. Interleaving of data can consist of single pixels (as discussed above in connection with FIGS. 2–6) or groups of pixels. For the later approach, a CRT FIFO 720 is used for CRT display 106 in order to keep the data stream to CRT display 106 constant. For devices like flat panel display 107, there may be a built-in FIFO (for a row), and thus an extra FIFO 721 may not be required, although use of one is still within scope of invention. Similarly, an additional FIFO 721 may not be necessary for flat panel display 107 where groups of pixels are interleaved in video memory 108, assuming that row boundaries are not crossed. Other display devices may include FIFOs larger than one row, which may also negate the need for either FIFO 720 or 721 in video controller 700.

While an important aspect of the invention deals with so-called special modes (i.e., modes other than standard VGA modes), these special modes should not be considered to be limiting to the invention; standard VGA modes could be used as well. In this sense, a flat panel display 107 could be running a standard VGA mode while CRT display 106 is running either SVGA mode or VGA mode.

It is further noted that while the present invention describes modifications to controllers such as the VGA standard, these same techniques can be used on other types of display controllers and are within the scope of the invention.

The speed of the various clocks necessary to drive a 1024×768 CRT display refreshed at 60 Hz or 72 Hz can be calculated as follows. For the horizontal scan, retracing typically requires approximately 20% of the time needed to scan a line. For vertical scanning, 7% of the total vertical scan time for retrace. Thus, the horizontal sync clocks and dot clocks would have the following approximate timing:

| 60 Hz Timing: | | |
|---|---|---|
| Dot Clock | : 1024/.8 * 768/.93 * 60 | = 63.4 Mhz |
| HSYNC | : 768/.93 * 60 | = 49.55 Khz |
| | | (20.2 usec) |
| 72 Hz Timing: | | |
| Dot Clock | : 1024/.8 * 768/.93 * 72 | = 76.1 Mhz |
| HSYNC | : 768/.93 * 72 | = 59.46 Khz |
| | | (16.8 usec) |

Using the clock speed calculated above, assume in a first case that both displays 106 and 107 have unequal display resolutions but are used with equal refresh rates. For example, flat panel display 107 may have a pixel resolution of 640×480 and a refresh rate of 60 Hz, while CRT display 106 may have a pixel resolution of 1024×768 and a refresh rate of 60 Hz. First assume that flat panel display 107 is a 640×480 color active matrix thin film transistor (TFT) display. For this situation, the vertical refresh rate for flat panel display 107 will be the same as CRT display 106 (either 60 or 72 HZ). Modern 640×480 TFT panels take data in a serial manner and the maximum rate of which is about 28 MHZ, much slower than the 63 and 76 MHZ rates calculated above. In this case, flat panel display 107 cannot take data for the "upper left" portion of a 1024×768 timing window because the timing is too fast. The data and clock speed need to be slowed down to the speed of flat panel display 107. It is also important (especially on TFT panels) to keep the horizontal rates within spec. The TFT transistors in flat panel display 107 are very slow as they are made from amorphous silicon. If the lines are driven too fast, the pixels will not be charged properly resulting in an improper display and even damage. The line time (HSYNC) for a TFT panel is about 31 KHz (32 usec) which is much slower than the 49 and 59 KHz rates calculated above. Thus, like the dot clock, the HSYNC timing must be slowed down as well.

Taking the HSYNC for a 60 Hz operation first, HSYNC timing for a 768 line CRT display needs about 7% retrace for a total of 825 lines while the 480 line TFT (which emulates a 480 line CRT display; thus also using about 7% retrace) needs a total of 523 lines. With an input clock of 63.4 MHz, approximately 2,013 pixels would be generated for CRT display 106, including retrace, in one 31.5 KHz period of flat panel display 107. In other words, about 1.6 lines are generated for CRT display 106 for every line displayed on flat panel display 107. Thus, it is possible to create a HSYNC timer (not shown) for a flat panel display 107 which counts (generally speaking) approximately 2013 pixels between HSYNC periods.

The 2013 pixels are divided into active and retrace periods since flat panel display 107 emulates the horizontal retrace of CRT display 106. Allocating the 2013 pixels into 80% active and 20% retrace periods results in 1610 active and 403 retrace pixels. Of course, the 1610 active pixels will contain 640 pixels for flat panel display 107 which is a ratio of about 2.5 CRT display pixels for every one flat panel display pixel, or a ratio of 1610/640=2.5. This ratio is not surprising since it follows that the total pixels on CRT display 106 divided by total pixels on flat panel display 107 is approximately the same ratio, or (1024×768)/(640×480)= 2.56. Thus, for every five pixels on CRT 106 there will be two pixels on flat panel display 107. To compensate for the unequal number of pixels, three pixels may be "thrown away" for flat panel display 107 for every five pixels displayed on CRT display 106.

It is also necessary to generate the correct clock timing for flat panel display 107 which is less than 28 MHz and is "square". Dividing the CRT pixel clock 761 by 2.5 in divider 763 is possible as shown in FIG. 8. Therein, flat panel display clock 762 rises on the rising edge of CRT display clock 761 pulses 0, 5, and 10. Flat panel display clock 762 also rises on the falling edge of CRT display clock 761 pulses 2, 7, and 12. However, flat panel display clock 762 pulses fall one quarter cycle after the rise of CRT display clock 761 pulses 1, 6, and 11, and also fall one-quarter cycle after the fall of CRT display clock 762 pulses 3, 8, and 13. It may be possible for some types of flat panel displays 107 to accept a duty cycle which is not 50%, and thus there would be no need to compensate for the one-quarter cycles. Alternatively, a clock cycle could be used which is two times faster than the CRT display clock 761 to generate a flat panel display clock 762 by dividing by five. In addition, it is possible to use a programmable pulse stretcher to compensate for the one-quarter cycle. Alternatively, a phased lock loop could be used to create flat panel display clock 762 from CRT display clock 761 (or visa versa). CRT display 106 uses all ten clock cycles shown in FIG. 9 while flat panel display 107 grabs pulses 0, 2, 5, 7, and 10. Thus, flat panel display clock 262 is now square and it is 40% as fast as CRT display clock 261 (i.e., 4*63.4=25.3 MHz) which is within the 28 MHz maximum speed for flat panel display 107.

While the timing generation is fairly straightforward, the memory model created for the user attempting to write drivers for this model could be unduly complex. Starting with a basic model of 1024× 768, memory may be organized such that, to the programmer, each line of CRT display 106 will begin on a 1024 boundary and the same will hold true for flat panel display 107. Flat panel display 107 will occupy the upper left quadrant of this space. This is accomplished by adding a "calculated offset" to any flat panel display memory address request. A register bit is provided to indicate when this offset will be active. The offset will be a function of the start address subtracted from the requested address. This difference is called delta. Delta is multiplied by two if odd and if delta is even, it is multiplied by two and incremented by one. Either case is still within the scope of the invention: using a "calculated offset" to allow flat panel display 107 to occupy essentially the same (or a portion) of the CRT display memory space, or using no "calculated offset" and forcing the software application to determine which locations in memory are for which display.

An alternative memory model may be used with the embodiment of FIG. 7 using a so-called ping-pong technique and FIFOs. Instead of trying to throw away pixels in a "mixed-stream" of data which has CRT display and LCD flat panel display data interleaved, one could, by using a CRT display address, grab an arbitrary number of pixels from video memory 108 for storage in a FIFO.

For example, for CRT display 106, an arbitrary number of pixels are fetched from video memory 108 at a rate faster than that required by CRT display 106. These pixels could then be stored in CRT FIFO 720. Then, for flat panel display 107, an arbitrary number of pixels are fetched from video memory 108 for storage in Flat panel FIFO 721 at a rate faster than required by flat panel display 107. A separate mechanism comprising AND gates 722 and 723 is then used to take data from CRT FIFO 720 and LCD flat panel display FIFO 721 at the rates required by those devices (CRT display clock 761 and flat panel display clock 762, respectively). This method provides a much simpler memory model for the software programmer. Pixel data for CRT display 106 could occupy a contiguous area in video memory 108 (e.g., 0 to x) while pixel data for flat panel display 107 could be located in a separate area of display memory 108 (e.g., x+n to Z). This method allows transfer between the two memory areas to work more smoothly (i.e., bit BLT operations can work will little or no modifications).

In other instances, it may be necessary to support two displays having different resolutions and different refresh rates. For example, flat panel display 107 may have a resolution of 640×480 pixels and a refresh rate of 60 Hz, while CRT display 106 has a resolution of 1024×768 pixels and a refresh rate of 72 Hz. The 76.1 MHz CRT clock (13.14 nsec) required by CRT display 106 scans 2415 pixels for every HSYNC period of LCD flat panel display 107, or almost 1.9 lines of CRT display 106 scanned for every line of flat panel display 107. Hence, for every 1932 pixels of CRT display 106 (including retrace) scanned are 640 pixels of flat panel display 107, or a ratio of about 3 to 1. Thus, the CRT display clock 761 should be divided by three, as shown in FIG. 9.

As shown in FIG. 9, flat panel display clock 762 rises on the rising edge of CRT display clock 761 pulse 0, but falls on the falling edge of CRT display clock 761 pulse 1. Flat panel display clock 762 rises again on CRT display clock 761 pulse 3 and falls again on pulse 4 and so on. CRT display 106 uses all ten clock cycles while flat panel display 107 grabs pulses 0, 3, 6, and 9 of CRT display clock 161. Flat panel display clock 762 is now square and is one-third as fast as CRT display clock 761 (e.g., 76.1/3=25.3 MHz) which is, again, within the 28 MHz maximum for flat panel display 107.

A different task is faced in creating a manageable memory model for software support. CRT display 106 is being refreshed at 72 Hz while flat panel display 107 is being refreshed at 60 Hz. This means that when CRT display 106 is finished with a first scan, flat panel display 107 is only 83% finished (60/72=0.83). This is a problem which is much more difficult to solve using the "interleaved data . . . throw away pixels" approach which worked in the case which had equal refresh rates. However, the alternative "Ping-Pong" approach used in that example can still be used to create a manageable memory model.

As shown in FIG. 7, memory controller 101 addresses video memory 108, which is driven by MEMCLK 725. MEMCLK 725 has a frequency equal to or greater than the sum of CRT display clock 761 and flat panel display clock 762, such that video memory 108 is accessed at a rate equal to or higher than the combined data rates of CRT display 106 and flat panel display 107. MEMCLK 725 also drives AND gates 722 and 723 which in turn drive CRT FIFO 720 and flat panel FIFO 721. Display select line 726 from memory controller 101 determines whether pixels for CRT display 106 or flat panel display 107 are being accessed from video memory 101. When display select line 726 goes high, AND gate 722 is activated, and data 751 from video memory 108 is clocked into flat panel FIFO 721 at the MEMCLK 725 rate. An arbitrary number of pixel data from that portion of video memory 108 containing pixel data for flat panel display 107 may be clocked into flat panel display FIFO 721, or until flat panel display FIFO is full (whichever comes first). When display select line 726 goes low, the signal is inverted in inverter 724 and the same process is repeated for CRT FIFO 720.

AND gates 728 and 729 serve to clock data out of FIFOs 721 and 720, respectively. AND gate 728 is driven by flat panel display clock 762 and gates out data from flat panel FIFO 721 at the rate of flat panel display clock 762. Since pixel data for flat panel display 107 is gated into flat panel display FIFO 721 by MEMCLK 725, a rate much higher than flat panel display clock 762, there is no danger of flat panel display FIFO 721 running out of pixel data for flat panel display 107. From the output of AND gate 728, pixel data passes to look-up table 732 which converts the pixel data to pixel words in a similar manner to the systems of FIGS. 1 and 2. The pixel data passes to flat panel controller 105 which controls flat panel display 107 in a similar manner to that shown in FIGS. 1 and 2.

AND gate 729 is driven by CRT display clock 761 and gates out data from CRT FIFO 720 at the rate of CRT display clock 761. Since pixel data for CRT display 106 is gated into CRT display FIFO 720 by MEMCLK 725, a rate much higher than CRT display clock 761, there is no danger of CRT display FIFO 720 running out of pixel data for CRT display 106. From the output of AND gate 729, pixel data passes to look-up table 730 which converts the pixel data to pixel words in a similar manner to the systems of FIGS. 1 and 2. The pixel data passes to DAC 104 which converts the pixel word data into analog red, green and blue values for display on CRT display 106 in a similar manner to that shown in FIGS. 1 and 2. Although look-up tables 730 and 732 are shown as separate elements in FIG. 7, these look-up tables could be combined into one common look-up table to drive both displays, with suitable combinational logic circuitry (not shown) to direct the pixel words to the correct display.

It will be readily seen by one of ordinary skill in the art that the present invention fulfills all of the objects set forth above. After reading the foregoing specification, one of ordinary skill will be able to effect various changes, substitutions of equivalents and various other aspects of the invention as broadly disclosed herein. It is therefore intended that the protection granted hereon be limited only by the definition contained in the appended claims and equivalents thereof.

What is claimed is:

1. Apparatus for simultaneously displaying a first video image on a first video display and a second video image independent from said first video image on a second video display, comprising:

a video memory controller coupled to a video memory storing a frame of data of said first video image and a different independent frame of data of said second video image, wherein even and odd numbered pixels of one frame of data of a first video image are respectively stored in first alternate byte planes of said video memory and even and odd numbered pixels of a different independent frame of data of a second video image are stored in second alternate byte planes of said video memory that are interleaved with said first alternate byte planes;

selector means, coupled to said video memory controller means, for selecting an output path such that each frame of said first video image from corresponding odd and even byte planes of said video memory is selectively coupled to said first video display and each frame of said second video image from corresponding odd and even byte planes of said video memory is selectively coupled to said second video display.

2. The apparatus of claim 1 further comprising:

attribute controller means, coupled to said video memory controller means and said selector means, for receiving said frame of data of said first video image and said frame of data of said second video image from said interleaved odd and even video memory byte planes and for sequentially outputting said frame of data of said first video image and said frame of data of said second video image to said selector means.

3. The apparatus of claim 2 wherein said selector means further comprises:

clock means for providing a first clock signal and a second clock signal 180° out of phase with said first clock signal;

a first latch means, coupled to said clock means, said attribute controller means, and said first display for receiving said frame of data of said first video image and said frame of data of said second video image and for outputting said frame of data of said first video image to said first display in response to said first clock signal; and a second latch means, coupled to said clock means, said attribute controller means, and said second display for receiving said frame of data of said first video image and said frame of data of said second video image and for outputting said frame of data for said second video image to said second display in response to said second clock signal.

4. A method of displaying video images on first and second image display units, comprising the steps of:

configuring a video memory into multiple byte planes;

storing even and odd numbered pixels of one frame of data of a first video image respectively in first alternate byte planes of said video memory;

storing even and odd numbered pixels of a different independent frame of data of a second video image in second alternate byte planes of said video memory that are interleaved with said first alternate byte planes;

successively reading from the first alternate byte planes of said video memory the even and odd numbered pixels of image data corresponding to said first video image and successively reading from the second alternate byte planes of said video memory the even and odd numbered pixels of image data corresponding to said second video image;

converting said pixels of said first video image and said pixels of said second video image to corresponding first and second video display unit drive signals; and successively routing said first and second video display unit drive signals to first and second video display units, respectively.

5. The method of claim 4, including the step of latching said first and second video display unit drive signals in first and second latch circuits to be provided to said first and second video display units, respectively.

6. The method of claim 5, wherein converting is carried out at a first rate and latching by said first and second latch circuits is carried out at a second rate that is a sub-multiple of the first rate.

7. The method of claim 6, wherein said first and second display units comprise, respectively, a CRT display and LCD flat panel display.

* * * * *